(12) United States Patent
Matlack et al.

(10) Patent No.: US 8,141,859 B2
(45) Date of Patent: Mar. 27, 2012

(54) APPARATUS AND METHOD FOR EFFECTING PIN-TO-SHOULDER TOOL SEPARATION FOR A FRICTION STIR WELDING PIN TOOL

(75) Inventors: Michael P. Matlack, St. Charles, MO (US); Kurt A. Burton, Wildwood, MO (US); John A. Baumann, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 1180 days.

(21) Appl. No.: 11/934,284

(22) Filed: Nov. 2, 2007

(65) Prior Publication Data

US 2009/0113689 A1 May 7, 2009

(51) Int. Cl.
*B25B 5/00* (2006.01)
(52) U.S. Cl. ......... 269/252; 269/255; 269/244; 269/251
(58) Field of Classification Search ............... 29/252, 29/255, 244, 251, 267, 272; 269/252, 255, 269/244, 251, 267, 272, 287; 451/381
See application file for complete search history.

(56) References Cited

U.S. PATENT DOCUMENTS

| | | | | |
|---|---|---|---|---|
| 255,384 A | * | 3/1882 | Fox | 279/102 |
| 1,122,114 A | * | 12/1914 | Hill | 451/381 |
| 1,899,351 A | * | 2/1933 | Overfelt | 29/244 |
| 2,138,051 A | * | 11/1938 | Williams | 366/113 |
| 2,281,479 A | * | 4/1942 | Chirelstein | 29/749 |
| 2,620,693 A | * | 12/1952 | Eslick | 269/32 |
| 3,334,405 A | * | 8/1967 | Cann et al. | 29/257 |
| 3,337,943 A | * | 8/1967 | Powell | 29/252 |
| 3,441,323 A | * | 4/1969 | Huffman et al. | 384/24 |
| 3,691,604 A | * | 9/1972 | Spontelli | 29/237 |
| 4,870,739 A | * | 10/1989 | Richards | 29/252 |
| 5,042,132 A | * | 8/1991 | Hardin | 29/252 |
| 5,197,965 A | * | 3/1993 | Cherry et al. | 606/54 |
| 5,231,733 A | * | 8/1993 | Dittman | 16/412 |
| 5,463,862 A | * | 11/1995 | Reisenauer | 59/7 |
| 5,860,203 A | * | 1/1999 | Gehr, Jr. | 29/252 |
| 5,893,507 A | | 4/1999 | Ding et al. | |
| 6,138,895 A | * | 10/2000 | Oelgoetz et al. | 228/112.1 |
| 6,264,088 B1 | | 7/2001 | Larsson | |
| 6,370,758 B1 | * | 4/2002 | Theis | 29/559 |
| 6,421,578 B1 | | 7/2002 | Adams et al. | |
| 6,460,863 B1 | * | 10/2002 | Wuertz et al. | 279/141 |
| 6,554,175 B1 | | 4/2003 | Thompson | |
| 6,732,900 B2 | | 5/2004 | Hansen et al. | |

(Continued)

FOREIGN PATENT DOCUMENTS

WO WO01/28732 A1 4/2001

*Primary Examiner* — George Nguyen
(74) *Attorney, Agent, or Firm* — Harness, Dickey & Pierce, P.L.C.

(57) ABSTRACT

An apparatus and method for separating a pin tool from a shoulder tool, after the pin tool and shoulder tool have become welded together during a friction stir welding operation. In one exemplary embodiment a frame is used to support the shoulder tool. A fluid pressure actuating assembly is used for gradually exerting a force on the pin tool while the shoulder tool is held stationary within the frame. The gradually increasing force gradually breaks the weld and separates the pin tool from the shoulder tool without damaging the pin tool.

17 Claims, 5 Drawing Sheets

U.S. PATENT DOCUMENTS

| | | |
|---|---|---|
| 6,742,696 B2 | 6/2004 | Thompson |
| 6,811,632 B2 * | 11/2004 | Nelson et al. ............... 156/73.5 |
| 6,874,672 B2 | 4/2005 | Okamoto et al. |
| 7,156,385 B2 * | 1/2007 | Mulder ............................ 269/32 |
| 7,234,625 B2 | 6/2007 | Loitz et al. |
| 7,383,975 B2 * | 6/2008 | Stol et al. ....................... 228/2.1 |
| 7,774,910 B2 * | 8/2010 | Baumann et al. .............. 29/271 |
| 2002/0084564 A1 * | 7/2002 | Horn et al. ....................... 269/32 |
| 2003/0201307 A1 | 10/2003 | Waldron et al. |
| 2003/0209586 A1 | 11/2003 | Thompson |
| 2006/0163316 A1 | 7/2006 | Burton et al. |
| 2007/0193247 A1 * | 8/2007 | Daniels et al. ...................... 59/7 |
| 2008/0237957 A1 * | 10/2008 | Waldorf .......................... 269/27 |

* cited by examiner

APPARATUS AND METHOD FOR EFFECTING PIN-TO-SHOULDER TOOL SEPARATION FOR A FRICTION STIR WELDING PIN TOOL

FIELD

The present disclosure relates to friction stir welding devices and methods, and more particularly to an apparatus and method that enables rapid and easy separation of a friction stir welding pin tool that has become welded to a shoulder tool after a friction stir welding operation.

BACKGROUND

The statements in this section merely provide background information related to the present disclosure and may not constitute prior art.

In Friction Stir Welding (FSW) applications there are two primary types of FSW tools. One of the most common types of FSW tools is a fixed pin type tool. The FSW pin tool is intimately connected to the FSW shoulder tool, and the two effectively act as a single unit. The single shoulder/pin is the most common of the welding tools.

The second type of FSW tool is a Retractable Pin Tool (RPT), with two individual tools identified as the pin and shoulder tools. The shoulder tool is a hollow shank with a flat, convex, or concave surface. The shoulder tool has a centered tight tolerance hole (i.e., bore) that is formed through the shank, which allows the pin to pass through the hole in order to obtain required differences in pin length, for such applications as tapered skin welding. The shoulder generally is parallel with the surface when it makes contact, and the pin tool is perpendicular to the work surface. In the case of an RPT, there are two separate pieces that are independent, with clearance between pin and shoulder components.

When performing a FSW procedure, plasticized material migrates up the pin on both the fixed pin and retractable pin tool surfaces. When the weld path is complete, and the spindle stopped, the material that has migrated between the two tools cools and solidifies, essentially fusing the shoulder tool and the retractable pin tool together. The additional material in between the retractable pin tool and the shoulder tool is difficult to separate because the two tools are powered by separate spindle motors. If the motors start at a different speed the high torque created by the two different motors can easily break an expensive pin tool.

When manually trying to force the fixed pin tool from its shoulder tool, or the retractable pin tool from its shoulder tool, using hand tools, it is extremely easy to accidentally break the pin tool. The pin tool typically runs several hundred dollars in cost, and thus breakage of pin tools can amount to a significant expense. Breakage also can interfere with continuing operation of a FSR system, and thus negatively affect its overall productivity.

SUMMARY

The present disclosure relates to an apparatus and method for separating a pin tool from a shoulder tool, after the pin tool has become welded to the shoulder tool during a friction stir welding operation. In one exemplary embodiment a frame is used to support the shoulder tool stationary. A fluid pressure actuating assembly is used for gradually exerting a force on the pin tool while the shoulder tool is held stationary within the frame. The gradually increasing force gradually breaks the weld and separates the pin tool from the shoulder tool without damaging the pin tool.

In various embodiments the pressure actuating assembly includes a fluid pressure generating subsystem that supplies a fluid pressure to a drive component subsystem. The drive component subsystem may be formed by a cylinder having an extendable and retractable piston. The piston may include a sleeve that is adapted to hold a rod, where the rod has a diameter enabling it to fit within a bore of the shoulder tool. The fluid pressure causes an extension of the piston, which causes the rod to come into contact with the pin tool that is welded within the bore of the shoulder tool. The force gradually is increased so that the weld between the shoulder tool and the pin tool is gradually broken without damaging the pin tool.

In still other embodiments the frame is adapted to hold a bushing, where the bushing is dimensioned to removably accept and hold the shoulder tool. The drive component subsystem may be fixedly supported within the frame in axial alignment with the bushing. The drive component subsystem may further include a sleeve that is held by the piston, with the sleeve adapted to hold a rod that is dimensioned to fit within the bore of the shoulder tool. The generation of fluid pressure by the fluid pressure generating subsystem may be manually controlled by an individual to ensure that the fluid pressure applied to the cylinder is gradually increased, and such that the force applied to the pin tool by the rod is gradually increased to eliminate (or virtually eliminate) the risk of damage to the pin tool as the weld is broken.

The various embodiments enable a shoulder tool and a pin tool of a retractable shoulder/pin tool assembly to be easily accommodated. Separating the pin tool from its associated shoulder tool without breakage can represent a significant cost savings in a friction stir welding operation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
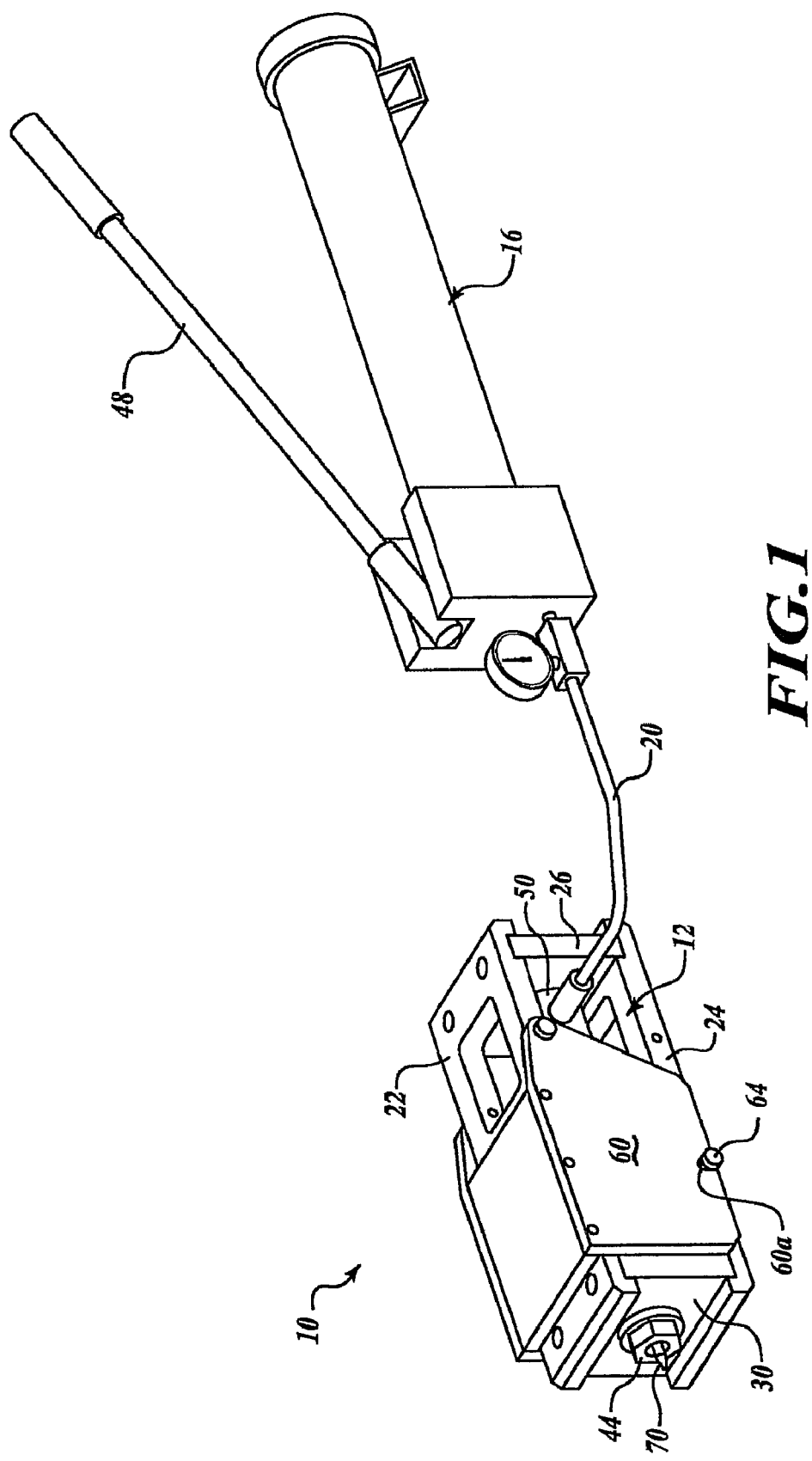
FIG. 1 is a perspective view of one exemplary embodiment of the apparatus of the present disclosure.
Figure 2:
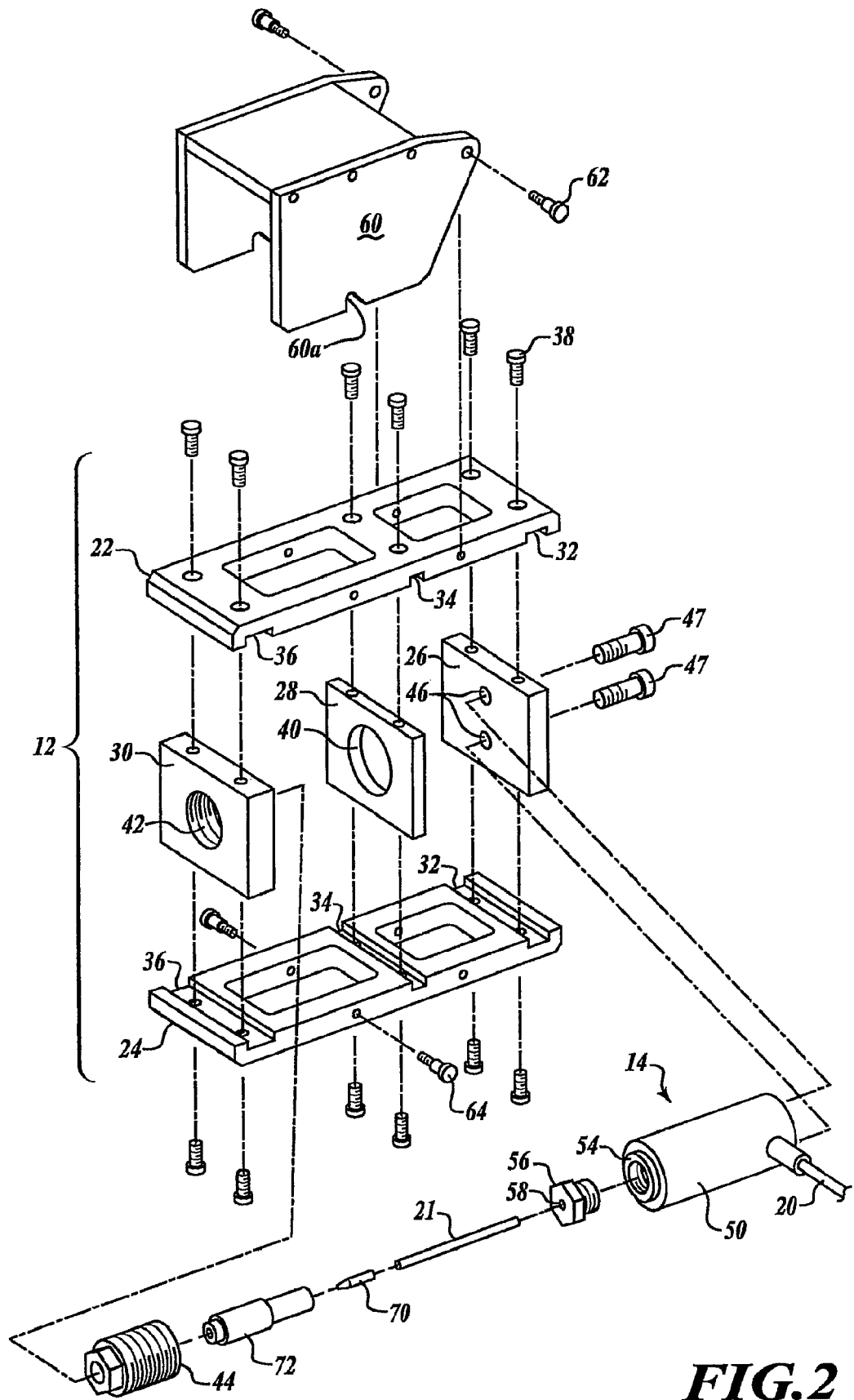
FIG. 2 is an exploded perspective view of various components of the apparatus of FIG. 1.
Figure 3:
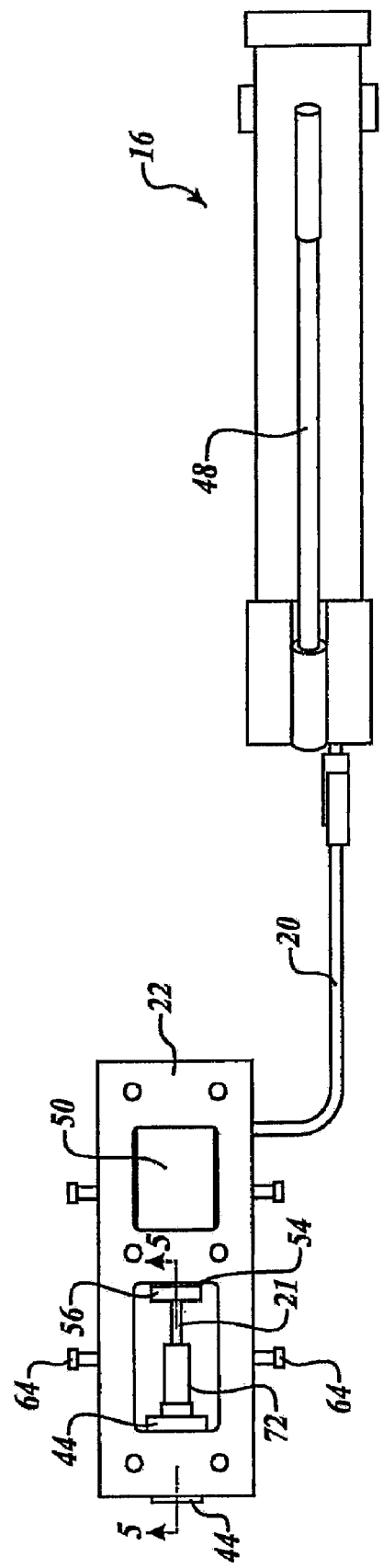
FIG. 3 is a plan view of the apparatus of FIG. 1 but with the movable cover removed and a shoulder tool held within a frame of the apparatus.

Referring to FIGS. 1, 2 and 3, there is shown a pin tool removal apparatus 10 in accordance with one exemplary embodiment of the present disclosure. The apparatus 10 is used to break the weld between a pin tool and a shoulder tool of a shoulder/pin tool assembly used in a friction stir welding (FSR) operation without damaging the pin tool. The apparatus 10, in this exemplary embodiment, includes a frame 12, a drive component subsystem 14 supported within the frame, and a fluid pressure generating subsystem 16. The fluid pressure generating subsystem 16 and the drive component subsystem 14 can cooperatively be viewed as a fluid pressure actuating assembly 18. The fluid pressure generating subsystem 16 applies a pressurized fluid, for example an hydraulic fluid, via a conduit 20 to the drive component subsystem 14. The drive component subsystem 14 includes a rod 21 that can be used to apply a linear, gradually increasing force to the pin tool positioned within the bore of the shoulder tool, to gradually break the weld between the pin tool and the shoulder tool without damaging the pin tool.

Referring specifically to FIGS. 2 and 3, the frame 12 includes top and bottom frame portions 22 and 24, and wall portions 26, 28 and 30 positioned within spaced apart channels 32, 34 and 36 in the frame portions 22 and 24. The wall portions 26, 28 and 30 are secured by fastening elements, for example threaded fastening elements 38 (FIG. 3), that may extend through holes in the top frame portion 22 and into blind threaded holes (not visible) in the bottom frame portion 24. Wall portion 28 has an aperture 40 that enables a portion of the drive component subsystem 14 to project therethrough. Wall portion 30 includes an aperture 42 that enables a bushing 44 to be positioned therein.

Figure 5:
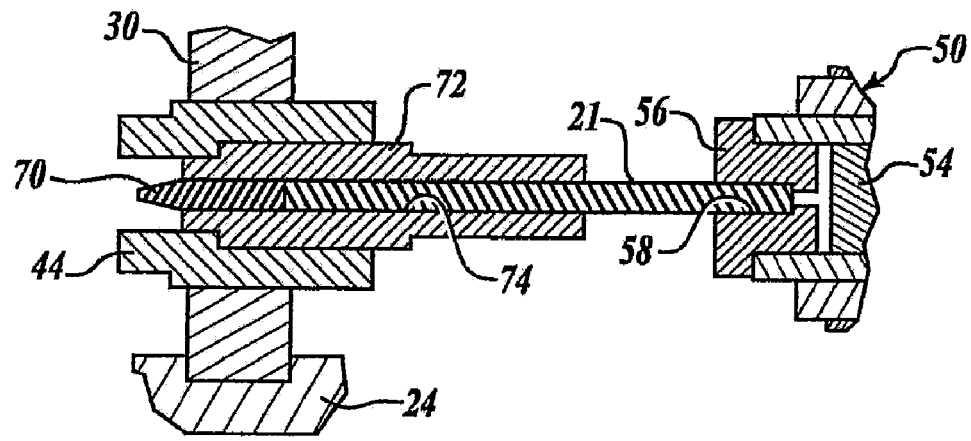
FIG. 5 is an enlarged cross sectional side view of a portion of the apparatus taken in accordance with section line 5-5 in FIG. 3, with a rod of the apparatus about to be moved into a bore of the shoulder tool to urge a pin tool that is welded inside the bore out from the bore.

With further reference to FIGS. 2, 3 and 5, the fluid pressure generating subsystem 16 forms a pump that includes a manually operated lever 48 (FIGS. 2 and 3) that enables an individual to gradually apply a pressurized fluid through the conduit 20 to the drive component subsystem 14. One suitable fluid pressure generating subsystem 16 is commercially available from the Enerpac Company of Milwaukee, Wis. The drive component subsystem 14, in this example, comprises an hydraulic cylinder 50 (also available from the Enerpac Company) having an input 52 coupled to the conduit 20. The hydraulic cylinder 50 effectively forms an hydraulic ram. The cylinder 50 has a linearly extendable and retractable piston 54 that carries a removable sleeve 56. The sleeve 56 has a bore 58 that holds the rod 21 removably therein and in axial alignment with the bushing 44. Wall portion 26 also includes a pair of holes 46 that enable threaded screws 47 to extend therethrough and to engage within threaded bores (not shown) in a portion of the cylinder 50, to support the cylinder 50 fixedly within the frame 12.

Figure 4:
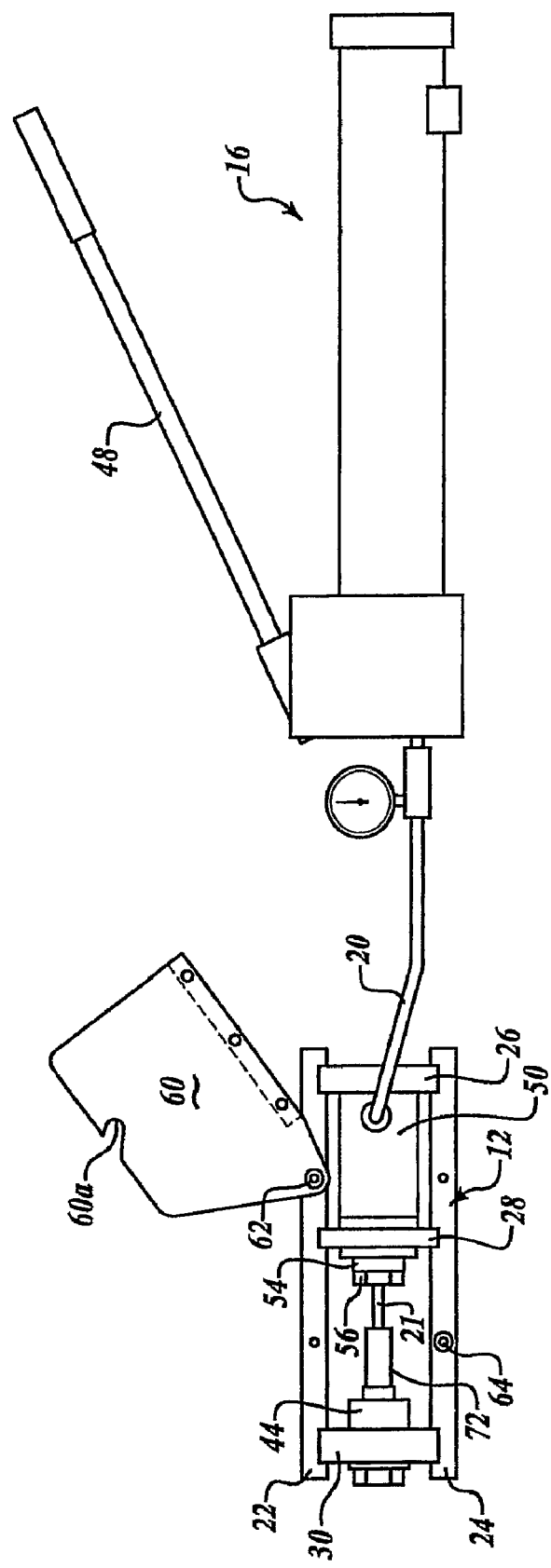
FIG. 4 is a side view of the apparatus of FIG. 1 but with the cover in its raised position.

Referring further to FIGS. 2 and 4, optionally, but preferably, the apparatus 10 includes a cover 60 that is pivotally supported to the frame 12 by a suitable pin or fastener 62. A separate pin or fastener 64 may be used as a "stop" to engage a notch 60a in the cover 60 to maintain the cover 60 in a desired position over the frame 12 when the apparatus 10 is being used. The cover 60 provides an added degree of protection in the event of breakage of the shoulder tool/pin tool assembly during the separation process.

Referring to FIGS. 3, 4, 5 and 6, a pin tool 70 and a shoulder tool 72 can be seen supported within the frame 12 of the apparatus 10. With specific reference to FIG. 5, the shoulder tool 72 is positioned within a bore 74 of the bushing 44 in axial alignment with the rod 21. It will be appreciated that the bore 74 of the bushing 44 is sized to accommodate the external diameter of the shoulder tool. The bushing 44 can be easily removed and replaced with a different bushing having a different bore diameter to thus enable the apparatus 10 to be used with different diameter shoulder tools. Similarly, the sleeve 56 can be removed and replaced with a different sleeve having a different internal diameter bore, to thus enable it to be used with a different diameter rod. Thus, it will be appreciated that the apparatus 10 can be easily configured to accommodate a plurality of different shoulder tools and pin tools simply by changing out the bushing 44 and the sleeve 56.

Figure 6:
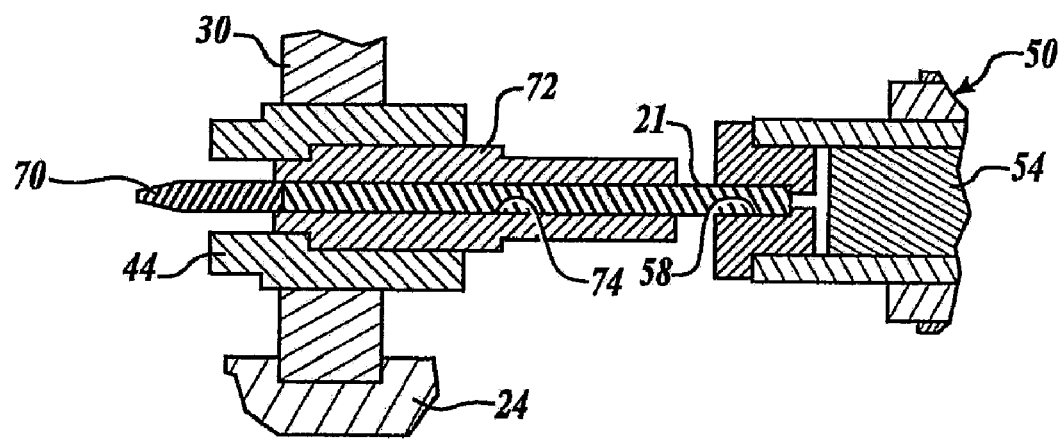
FIG. 6 illustrates the rod shown in FIG. 5 having been moved into the bore to of the shoulder tool and having broken the weld between the pin tool and the shoulder tool, and the pin tool being partially ejected from the bore.

In the drawings of FIGS. 5 and 6, the pin tool 70 has been welded to an interior wall surface of the bore 74 of the shoulder tool 72 during a previous friction stir welding operation. The apparatus 10 is used to separate the pin tool 70 from the shoulder tool 72 by first positioning the shoulder tool 72 in the bushing 44 within the frame 12, as shown in FIGS. 5 and 6. An individual then manually pumps the lever 48 which applies a pressurized fluid into the cylinder 50 of the drive component subsystem 14. The pressurized fluid causes the piston 54 to extend, as shown in FIG. 6, so that the rod 21 is moved linearly into contact with the pin tool 70. As further fluid pressure is applied via the lever 48, the gradually increasing fluid pressure in the cylinder 50 causes a gradually increasing linear force to be applied to the pin tool 70. The gradually increasing force eventually breaks the weld between the pin tool 70 and the interior wall surface of the bore 76 of the shoulder tool 72. Once the weld is broken, the lever 48 is released and the pressure within the cylinder 50 is removed. The piston 54 is then retracted and the pin tool 70 can be removed from the shoulder tool 72.

It is a significant advantage of the apparatus 10 and method of the present disclosure that the manner in which a controlled, gradual force is applied to the pin tool 70 eliminates, or substantially reduces the chance of breakage of the pin tool during the separation process. It is a further significant advantage that the separation process can be performed relatively quickly, with only limited prior experience in using the apparatus 10, by an individual. The apparatus 10 can also easily be tailored for use with a variety of shoulder tools of different dimensions. The apparatus 10 further enables a shoulder tool to be quickly, accurately positioned in the apparatus without special tools, and to be quickly and easily removed from the apparatus, also without requiring any special tools or handling procedures. The apparatus 10 is further relatively compact and light in weight, making it easy to transport and use at different locations within a manufacturing environment.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An apparatus for separating a pin tool from a shoulder tool of a friction stir welding tool assembly, said apparatus comprising:

a frame for supporting a shoulder tool, where said shoulder tool has a pin tool positioned within a bore of said shoulder tool, said pin tool having been secured to said shoulder tool by a plasticized material forming a weld therebetween during a friction stir welding process;

a bushing having a bore, with the bore precisely sized to receive a portion of a length of the shoulder tool therein, and wherein the bore has a shape that is complementary to an external shape of the shoulder tool such that the bore supports the shoulder tool with little or no axial play within the bore, the bushing further being supported by said frame for holding said shoulder tool immovably while force is exerted along an axial center of said pin tool; and a fluid pressure actuating assembly having a piston aligned coaxially with an axial center of said bore, for gradually exerting axial force on said pin tool while said shoulder tool is held fixedly within said bushing, to gradually break said weld and separate said pin tool from said shoulder tool.

2. The apparatus of claim 1, wherein said fluid pressure actuating assembly comprises:

a fluid pressure generating subsystem; and a drive component subsystem responsive to said fluid pressure generating subsystem for exerting a force on said pin tool.

3. The apparatus of claim 2, wherein said drive component system includes a rod, said rod being dimensioned to fit within said bore of said shoulder tool and being disposed coaxially with said bore of said bushing.

4. The apparatus of claim 2, wherein said drive component subsystem is supported within said frame.

5. The apparatus of claim 2, wherein said fluid pressure generating subsystem comprises a manually actuated fluid pressure generating device that enables an increasing fluid pressure to gradually be applied to said drive component subsystem.

6. An apparatus for separating a pin tool from a shoulder tool of a friction stir welding tool assembly, comprising:

a frame for supporting a bushing, the bushing having a bore sized to hold a portion of a shoulder tool, and wherein the bore has a shape that is complementary to an external shape of the shoulder tool such that the bore supports at least the portion of the shoulder tool therein with little or no axial play within the bore;

a fluid pressure generating subsystem;

a drive component subsystem supported on said frame and having a rod, the rod having a diameter selected to fit within a bore of the shoulder tool and to be moveable within the bore in the shoulder tool, with little or no axial play;

the drive component being responsive to said fluid pressure generating subsystem, and adapted to apply a manually controllable linear force to the rod long along an axial center of the bushing, to thus apply the linear force along an axial center of a pin tool positioned within a bore of a shoulder tool, where the pin tool has been secured to the shoulder tool by a plasticized material forming a weld therebetween during a friction stir welding process; and the fluid pressure generating subsystem adapted to cause the drive component system to exert a linear force on the pin tool to gradually break the weld between the shoulder tool and the pin tool without damaging the pin tool or the shoulder tool.

7. The apparatus of claim 6, wherein the fluid pressure generating subsystem comprises a manually operated pump for applying a fluid under pressure to said drive component subsystem.

8. The apparatus of claim 7, wherein said drive component subsystem comprises:

a piston on which a pressurized fluid from said fluid pressure generating subsystem acts; and a sleeve operably associated with and supported by said piston, the sleeve including a bore for receiving a terminal end of the rod, and where the bore of the sleeve is dimensioned such that the terminal end of the rod has little or no axial play within the bore in the sleeve.

9. The apparatus of claim 6, further comprising a movable cover for covering a portion of said frame.

10. The apparatus of claim 8, wherein said drive component subsystem is coupled to said fluid pressure generating subsystem by a flexible conduit.

11. An apparatus for separating a pin tool from a shoulder tool of a friction stir welding tool assembly, comprising:

a frame;

a bushing adapted to be positioned on said frame and held fixedly on said frame, the bushing having a bore with a diameter selected to removably support a portion of a shoulder tool therein, and where the bore further has a shape that is complementary to an external surface of the shoulder tool such that the bore supports the portion of the shoulder tool with little or no axial play;

a fluid pressure generating subsystem;

a drive component subsystem supported on said frame in axial alignment with said bushing and responsive to said fluid pressure generating subsystem, and adapted to apply a linear force to a pin tool positioned within a bore of a shoulder tool in response to fluid pressure generated by said fluid pressure generating subsystem, the pin tool having been secured to the shoulder tool by a plasticized material forming a weld therebetween during a previously executed friction stir welding operation; and the fluid pressure generating subsystem adapted to cause the drive component subsystem to exert a gradually increasing linear force on the pin tool, while said shoulder tool is being held immovably by said bushing, to gradually break the weld between the shoulder tool and the pin tool.

12. The apparatus of claim 11, wherein said drive component subsystem includes:

a fluid pressure activated cylinder having a piston;

a sleeve secured to an end of the piston, the sleeve having a bore;

a rod inserted into the bore of the sleeve, the rod further being dimensioned to fit into said bore in said shoulder tool and being axially aligned with said bore of said shoulder tool to enable said rod to make contact with said pin tool as said piston is extended in response to a fluid pressure generated from said fluid pressure generating subsystem.

13. The apparatus of claim 12, wherein said fluid pressure generating subsystem comprises a manually actuated lever for enabling an individual to manually generate said gradually increasing fluid pressure to said cylinder.

14. The apparatus of claim 12, wherein the bushing and the sleeve are removably mounted within said frame and said end of said piston, respectively.

15. A method of separating a pin tool from a shoulder tool of a friction stir welding tool assembly without breaking the pin tool, said method comprising:

supporting a shoulder tool immovably within a bore of a bushing, where said bore has a shape that is complementary to an external surface of said shoulder tool, and where said bore in said bushing has a diameter selected to provide little or no axial play of said shoulder tool when said shoulder tool is positioned within said bore in said bushing, and where said shoulder tool has a pin tool positioned with a bore of said shoulder tool, said pin tool having been secured to said shoulder tool by a plasticized material forming a weld therebetween during a friction stir welding process;

disposing a linearly extendable component in axial alignment with said pin tool;

inserting a removable rod within a sleeve associated with said linearly extendable component, said removable rod having a diameter selected to enable it to be inserted within said bore in said shoulder tool while allowing little or no play of said rod within said bore of said shoulder tool; and using a fluid pressure to gradually exert a gradually increasing force on said rod of said linearly extendable component, that said linearly extendable component applies to said pin tool while said shoulder tool is being held immovably, to gradually break said weld and separate said pin tool from said shoulder tool.

16. The apparatus of claim 15, wherein using a fluid pressure to gradually exert an increasing force comprises using a manually actuated fluid pressure device that enables an individual to manually control the generation of said force.

17. The apparatus of claim 15, wherein disposing a linearly extendable component comprises disposing a cylinder having a piston in axial alignment with said shoulder tool, and securing said cylinder against movement relative to shoulder tool.

* * * * *